(12) United States Patent
Lin et al.

(10) Patent No.: US 10,174,414 B2
(45) Date of Patent: Jan. 8, 2019

(54) MANUFACTURED ARTICLE AND METHOD

(71) Applicant: GENERAL ELECTRIC COMPANY, Schenectady, NY (US)

(72) Inventors: Dechao Lin, Greer, SC (US); David Vincent Bucci, Simpsonville, SC (US); Srikanth Chandrudu Kottilingam, Simpsonville, SC (US); Yan Cui, Greer, SC (US); David Edward Schick, Greenville, SC (US); Eric Eicher McConnell, Easley, SC (US); David Singletary, Greenville, SC (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 0 days.

(21) Appl. No.: 15/434,750

(22) Filed: Feb. 16, 2017

(65) Prior Publication Data
US 2018/0230584 A1 Aug. 16, 2018

(51) Int. Cl.
| B23K 35/00 | (2006.01) |
| C23C 10/34 | (2006.01) |
| C04B 37/02 | (2006.01) |
| B23K 35/02 | (2006.01) |
| B23K 35/30 | (2006.01) |

(52) U.S. Cl.
CPC .......... *C23C 10/34* (2013.01); *B23K 35/0233* (2013.01); *B23K 35/0238* (2013.01); *B23K 35/308* (2013.01); *B23K 35/3046* (2013.01); *B23K 35/3053* (2013.01); *B23K 35/3086* (2013.01); *C04B 37/026* (2013.01); *C04B 2237/122* (2013.01); *C04B 2237/72* (2013.01)

(58) Field of Classification Search
CPC ................ B23K 3/0623; B23K 9/23
USPC .......................................... 228/254
See application file for complete search history.

(56) References Cited

U.S. PATENT DOCUMENTS

| 6,612,480 | B1 * | 9/2003 | Rafferty | B23K 35/0233 228/119 |
| 9,776,282 | B2 * | 10/2017 | Subramanian | B23K 26/32 |
| 2002/0100793 | A1 * | 8/2002 | Fried | B23K 1/0018 228/119 |
| 2009/0068446 | A1 * | 3/2009 | Bischof | B23K 1/0018 428/336 |
| 2009/0286102 | A1 * | 11/2009 | Mohyi Hapipi | B23K 1/0018 428/613 |

(Continued)

FOREIGN PATENT DOCUMENTS

| EP | 3 081 323 A1 | 10/2016 |
| EP | 3 103 570 A1 | 12/2016 |

OTHER PUBLICATIONS

Extended European Search Report and Opinion issued in connection with corresponding EP Application No. 18155251.4 dated Jun. 25, 2018.

*Primary Examiner* — Erin B Saad
(74) *Attorney, Agent, or Firm* — McNees Wallace & Nurick LLC

(57) ABSTRACT

Manufactured articles, and methods of manufacturing enhanced surface smoothed components and articles. More particularly, surface smoothed components and articles, such as combustor components of turbine engines, having surface treatment conferring reduced roughness for enhanced performance and reduced wear related reduction in part life.

20 Claims, 1 Drawing Sheet

(56) References Cited

U.S. PATENT DOCUMENTS

| | | | |
|---|---|---|---|
| 2010/0215984 A1* | 8/2010 | Oiwa | B23K 35/0244 |
| | | | 428/680 |
| 2014/0017415 A1* | 1/2014 | Lin | C23C 26/00 |
| | | | 427/580 |
| 2015/0321289 A1* | 11/2015 | Bruck | B05D 3/0254 |
| | | | 427/554 |
| 2016/0069184 A1* | 3/2016 | Ribic | F01D 5/005 |
| | | | 416/95 |
| 2016/0089719 A1 | 3/2016 | Lacy et al. | |
| 2016/0089859 A1 | 3/2016 | Lacy et al. | |

* cited by examiner

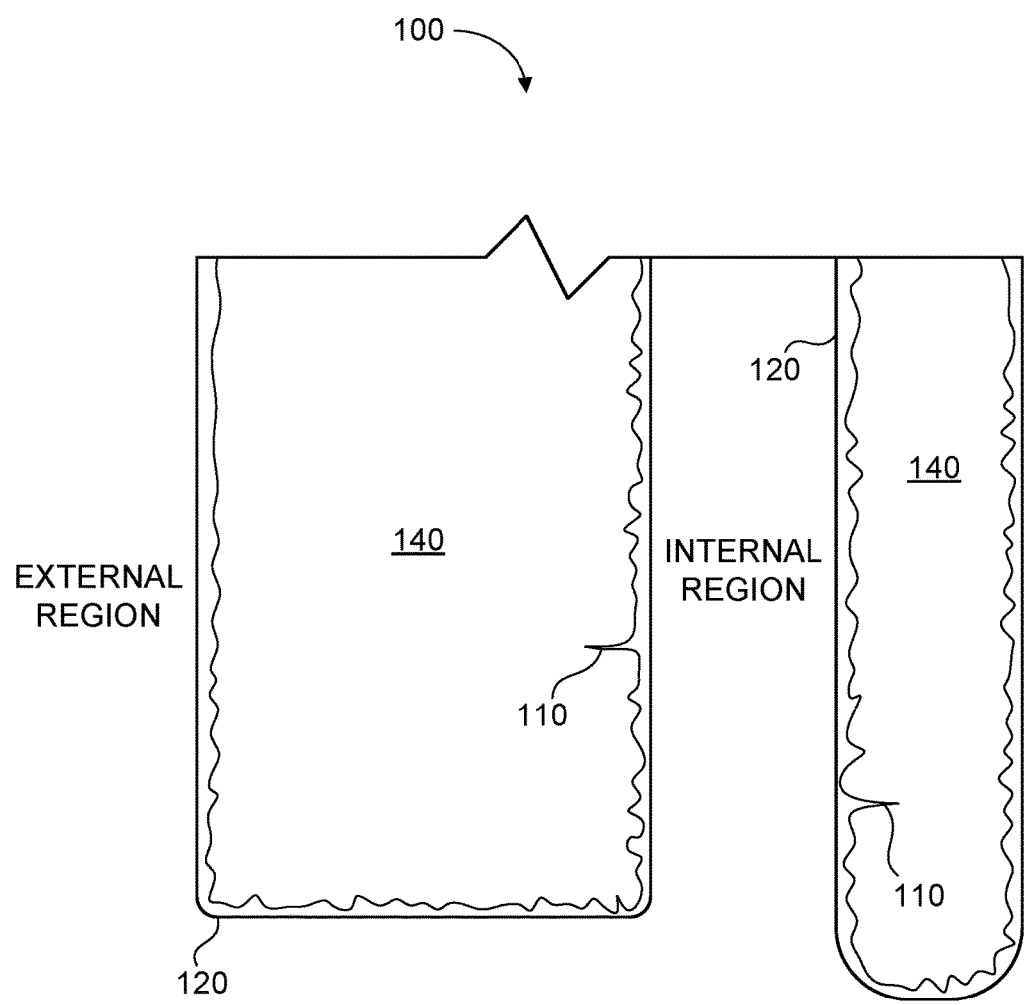

MANUFACTURED ARTICLE AND METHOD

FIELD OF THE INVENTION

The present invention is directed to surface treated articles, and methods of manufacturing surface treated articles that are formed, at least in part, by additive manufacturing. More particularly, embodiments of the present invention relate to components and articles, such as combustor components of turbine engines, and even more particularly to micromixer tubes and assemblies thereof, having surface treatment to diminish surface roughness for enhanced performance and extended part life.

BACKGROUND OF THE INVENTION

Metal additive manufacturing methods enable manufacturers to create end-use metal articles that often outperform those produced with traditional machining and casting techniques. These methods may also enable the manufacture of parts that cannot otherwise be made by conventional methods. And they may provide the benefit of significantly reduced manufacturing costs. Once those articles are installed for end-use, they contribute to cost savings because of one or more of light weight, high strength, and precise fit. In the context of turbines, particularly gas or steam turbines, a variety of components or portions thereof may be additively manufactured, including, for example: turbine component selected from the group consisting of a hot gas path component, a shroud, a bucket (blade), a nozzle (vane), and a seal. In some particular examples, combustor components and hot gas path components may be manufactured by additive processes to enable forming of complex geometries without the requirement for extensive post processing, including, but not limited to, nozzle bars, micromixer plenums, combustion flex tips and microchannel cooled shrouds.

Though there are many benefits to be realized with additive manufacturing, in contrast to some conventional manufacturing techniques, articles that are additively manufactured may have surface features that are less refined or less smooth. Some artifacts of the additive manufacturing process include surfaces that are rough and irregular, and include or may be prone to cracks, gaps and other defects. Thus, while many advantages can be achieved through additive manufacturing, a drawback is that the resultant rough surfaces can adversely affect performance both in terms of the flow dynamics and leakage, and in some cases the parts cannot be used due to compromised flow integrity due to gaps and cracks. This aspect of the manufacturing process necessitates post processing procedures which can at least in part obviate some benefits related to cost, and can also adversely affect the preservation of fine structures and complex geometries of the manufactured article.

Accordingly, there is a need in the art for post processing treatments to reduce the surface roughness without appreciably altering the structural features of the additively manufactured article.

BRIEF DESCRIPTION OF THE INVENTION

According to an aspect of the invention, an article includes an additively formed component or portion of a component having a surface treatment, the surface treatment comprising at least one braze film. The formed component or portion includes sequentially joined layers of material, such as, for example, one or more of a variety of metallic powders and the surface treatment comprising at least a brazed coating. In certain embodiments, the metallic powders are selected from one of nickel-based superalloy, cobalt-based superalloy, iron-based superalloy, and combinations thereof. In some exemplary embodiments, materials for the printed component are selected from CoCrMo (Co-28Cr-6Mo) and Haynes 282 (Ni-20Cr-10Co-8Mo-1.5Al-2Ti), and the brazed coating formed with metal alloys and superalloys, including nickel and cobalt-based superalloys, alloys and combinations thereof. In various embodiments, the component or portion thereof may be selected from a turbine component and in some particular embodiments, a combustor component, such as, for example, nozzle bars, a micromixer tube or a combustion flex tip.

According to another aspect of the invention, a method for fabricating a component or portion thereof includes the steps of providing at least one metallic powder that is heated to a temperature sufficient to join at least a portion of the metallic powder, and the process iterated to form a plurality of layers. In certain embodiments, the metallic powder is selected from one or more of a variety of metallic powders selected from the group consisting of nickel-based superalloy, cobalt-based superalloy, iron-based superalloy, and combinations thereof. The method further includes applying a surface treatment to all or at least a portion of one or more of the internal and external surfaces of the additively manufactured component or component portion, the treatment comprising application of a braze alloy to form a brazed coating, the method optionally further includes applying at least one bonding coat layer directly adjacent to the component or portion thereof, over which layer the brazed layer is applied. The method optionally includes applying at least an additional layer of one or more of a corrosion resistant alloy and an abrasion resistant alloy. In various embodiments, the component or portion thereof may be selected from a turbine component and in some particular embodiments, a combustor component, such as, for example, nozzle bars, micromixer tube or a combustion flex tip.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

FIG. 1 is a schematic view of a treated part, according to an embodiment of the present disclosure.

DETAILED DESCRIPTION OF THE INVENTION

Provided are articles comprising components or portions thereof having a smoothness-enhanced treated surface and methods for fabricating the same. Embodiments of the present disclosure, in comparison to components and methods not using one or more of the features disclosed herein, provide additively manufactured components and portions thereof that can achieve healing of surface imperfections that are artifacts of the manufacturing process, achieve smoothing of cooling holes and other component structural features, achieve increased corrosion, oxidation and thermal resistance of the component, extend the operating lifetime of the parts, minimize the need for post processing, permit components to be more efficient, permit use of less costly underlying parts materials, achieve enhanced flow rates, reduce or eliminate leaking through printed components, and combinations of these. Further, according to the instant disclosure, components that may not meet flow requirements may be processed to achieve suitable surface properties that may not be adequately remedied by other methods such as hot isostatic pressing and extrude honing.

In accordance with the disclosure, methods are provided for enhancing or improving the surface smoothness of a component or portion thereof, for example, a combustor component. A component or portion thereof formed according to one or more of the methods disclosed herein includes any component surfaces that are one or more of internal and external. In accordance with the various embodiments, the components are formed by one or more of various additive manufacturing methods, such as, for example, direct metal laser melting ("DMLM") made components. Representative examples of components include additively manufactured (by, e.g., DMLM) gas or steam turbine components, including but not limited to any one or more of a combustor, a combustion liner, a transition piece, a hot gas path component, a shroud, a bucket (blade), a nozzle (vane), a seal, and combinations thereof. In some examples, the components include honeycombs, bucket tips, seals, and fins. In some particular examples, combustor components and hot gas path components may be manufactured by additive processes to enable forming of complex geometries without the requirement for extensive post processing, particularly components having micro-channels and other complex internal passages for cooling, including, but not limited to, nozzle bars, micromixer plenums, combustion flex tips and micro-channel cooled shrouds.

In some particular examples, the surface treatment is particularly suited for component surfaces that are exposed to high temperatures, such as, but not limited to, temperatures of at least 1,500° F. In some particular embodiments, suitable components include hot gas path components, combustion components, and in some particular embodiments, a combustor component selected from, for example, nozzle bars, a micromixer tube, or a combustion flex tip, and various combinations thereof. For example, one suitable component includes a micromixer tube assembly having a high temperature surface that is a flame contacting surface.

In accordance with the disclosure, a component or portion thereof is formed by an additive, or "three-dimensional," printing process. The additively manufactured component or portion is further processed by application of a braze coat, the coat provided to overcome the typical rough surface finish and surface imperfections that are found, particularly on component portions that lack direct contact with the supporting substrate, which untreated can give rise to performance issues, including leaks due to roughness related gaps. According to the methods, the braze coat is provided by any suitable brazing technique.

Additive manufacturing methods generally include any manufacturing method for making and/or forming net or near-net shape structures. As used herein, the phrase "near-net" refers to a structure, such as the component, being formed with a geometry and size very similar to the final geometry and size of the structure, requiring little or no machining and processing after the additive method. As used herein, the phrase "net" refers to the structure being formed with a geometry and size requiring no machining and processing. The structure formed by the additive manufacturing method includes any suitable geometry, such as, but not limited to, square, rectangular, triangular, circular, semicircular, oval, trapezoidal, octagonal, pyramidal, geometrical shapes having features formed therein, any other geometrical shape, or a combination thereof. For example, the additive method may include forming cooling features.

In general, additive manufacturing processes comprise distributing a material to a selected region on a support or substrate/base and selectively melting or sintering the material with a laser or electron beam, or an equivalent process. A predetermined design file or two-dimensional slices of a three-dimensional file, for example, may be utilized from a computer-aided design program for the formation of the component or portion. The material may be in the form of atomized powder. Examples of additive manufacturing, or three-dimensional printing, processes include, but are not limited to, the processes known to those of ordinary skill in the art as DMLM, Direct Metal Laser Sintering ("DMLS"), Selective Laser Sintering ("SLS"), Selective Laser Melting ("SLM"), and Electron Beam Melting ("EBM"). As used herein, the term "three-dimensional printing process" refers to the processes described above as well as other suitable current or future processes that include the build-up of materials layer by layer. Suitable materials for three-dimensional printing processes may include, but are not limited to, plastic, thermoplastic, metal, metallic, ceramic, other suitable materials, or a combination thereof. In particular examples, suitable materials for the atomized powder may include, but are not limited to, stainless steel, tool steel, cobalt chrome, titanium, nickel, aluminum, alloys thereof, and combinations thereof.

Thus, the method for fabricating a component or portion according to the instant disclosure includes, in various examples, providing a metallic powder to a substrate surface, heating the metallic powder to a temperature sufficient to join at least a portion of the metallic powder to form an initial layer, and sequentially forming additional layers over the initial layer to form a formed component or portion thereof. The heating of the metallic powder includes any suitable method, such as, for example, controllably directing a focused energy source toward the metallic powder. Suitable focused energy sources include, but are not limited to, a laser device, an electron beam device, or a combination thereof. The parameters of the focused energy source will depend upon the material of the metallic powder used to form the formed component or portion and/or a desired thickness of each layer of the build.

In some particular embodiments, suitable materials for the metallic powder include any material capable of being joined through additive manufacturing, such as, but not limited to, a metal, a metallic alloy, a superalloy, steel, a stainless steel, a tool steel, nickel, cobalt, chrome, titanium, aluminum, or a combination thereof. For example, in one embodiment, the material for the metallic powder includes a cobalt(Co)-chromium(Cr)-molybdenum(Mo) alloy, such as, but not limited to, 70Co-27Cr-3Mo.

In some particular embodiments, the material for the atomized powders may include metal alloys, including nickel and cobalt-based superalloys, stainless and alloy steels, and titanium, aluminum and vanadium alloys. A suitable example of a cobalt-based alloy may have a formula (by mass) of $Co_{0.39-0.41}Cr_{0.19-0.21}Ni_{0.14-0.16}Fe_{0.113-0.205}Mo_{0.06-0.08}Mn_{0.015-0.025}$ (commercially available as Co—Cr—Ni alloy). A suitable example of a nickel-based alloy may have a formula (by mass) of $Ni_{0.50-0.55}Cr_{0.17-0.21}Fe_{balance}Mo_{0.028-0.033}Nb_{0.0475-0.055}Co_{0.01}Mn_{0.0035}Cu_{0.002-0.008}Al_{0.0065-0.0115}Ti_{0.003}$ (commercially available as Inconel 718) or a formula (by mass) of $Ni_{balance}Cr_{0.20-0.23}Fe_{0.05}Mo_{0.08-0.10}Nb+Ta_{0.0315-0.0415}Co_{0.01}Mn_{0.005}Al_{0.004}Ti_{0.004}$ (commercially available as Inconel 625). Suitable examples of titanium-based alloys include those known by the trade names Ti-6Al-4Va and Aluminum 6061. In various non-limiting examples, components may include any suitable material, for example, stainless steel, a nickel-based alloy, an iron-based alloy, or any other suitable metal or metallic material. In one embodiment the component or portion thereof, is formed of a stainless steel and/or a nickel-based alloy, such as Hastelloy® X, the aforementioned material being discussed herein as merely illustrative and non-limiting. In some exemplary embodiments, materials for the printed component are selected from CoCrMo (Co-28Cr-6Mo) and Haynes 282 (Ni-20Cr-10Co-8Mo-1.5Al-2Ti).

Once formed, the component or portion thereof is further processed by application of a braze coating. It will be appreciated that the terms "braze" "brazing" "braze film" and "braze coating" as used herein are with reference to surface treatment of a component or portion, such as a micromixer tube, wherein the process does not include joining workpieces, but rather is performed to affix a braze material directly to the surface of the micromixer tube to achieve benefits conferred by the resultant braze film.

In some embodiments according to the invention, the techniques of vacuum brazing are used. As used herein, vacuum brazing means and refers to a process that offers the advantages of providing clean, superior, flux-free braze joints and surfaces of high integrity and strength. The process is performed inside a vacuum chamber vessel for a period of time from about 10-30 minutes at a pressure of not more than $8 \times 10^{-4}$ torr, wherein temperature uniformity typically in the range from about 1500° F. to about 2300° F. is maintained on the work piece under continuous heat to thereby reduce or eliminate the stress that can be introduced by other methods where heating and cooling cycles can occur.

Thus, in one non-limiting example, the brazing is accomplished as a single-step vacuum brazing, at a pressure of not more than $8 \times 10^{-4}$ torr, wherein the brazing temperature is between about 1500° F. and about 2300° F., between about 1500° F. and about 1800° F., between about 2000° F. and about 2300° F., between about 1800° F. and about 2300° F., between about 1800° F. and about 2100° F., or any suitable combination, sub-combination, range, or sub-range therein. In one non-limiting embodiment, the brazing duration is between about 1 minute and about 30 minutes, between about 5 minutes and about 30 minutes, between about 15 minutes and about 30 minutes, between about 20 minutes and about 30 minutes, about 10 minutes, about 15 minutes, about 20 minutes, about 30 minutes, or any suitable combination, sub-combination, range, or sub-range therein.

Referring now to the drawings, FIG. 1 is a schematic depicting a portion of a component 100 treated in accordance with the disclosure. In accordance with this representative example, a surface treatment 120 is applied to a component or at least a portion of a component 100, for example, at least one micromixer tube, the treatment comprising a brazed coating, by application of one or a mix of braze materials, followed by vacuum brazing. The component or portion thereof 100 is characterized in some examples as having surface treatment 120 applied to any one or more of an internal surface and external surface on a metallic substrate 140, which surfaces may include any one or more of planes, corners, curves, and contours and may further include cracks or other gaps 110 on the surface and penetrating into the substrate 140. With specific reference again to FIG. 1, the substrate 140 of the component 100 includes gaps (cracks) 110 as well as external and internal surfaces. According to the methods, and as depicted in FIG. 1, the surface treatment 120 is applied so as to smooth the internal and external surfaces on the substrate 140 of the component 100, including at least partially filling cracks 110 and smoothing all treated planar surfaces, corners, curves and contours.

In accordance with the methods, the braze material comprises known or novel low melt materials, and in particular, for use with tubes formed of stainless steel, the braze materials are particularly compatible with such tube-based material. In accordance with the example, the material for the braze powders selected for the braze coat surface treatment may be any suitable brazing material, including, but not limited to, metal alloys and superalloys, including nickel and cobalt-based superalloys, alloys and combinations thereof. Suitable examples of a nickel-based alloy may have a formula (by mass) of $Ni_{0.6715}Cr_{0.14}B_{0.0275}Co_{0.1}Al_{0.035}Ta_{0.025}Y_{0.001}$ (commercially available as Amdry DF4B from Sulzer Metco, located in Westbury, N.Y.) or a formula (by mass) of $Ni_{0.71}Cr_{0.019}Si_{0.10}$ (commercially available as BNi-5 from many providers, including Wall Colmonoy, located in Madison Heights, Mich.). Of course, it will be appreciated that other base materials may be used for forming components by additive manufacturing, and as such, other braze materials may be selected, which may be low melt or other than low melt, and the method of brazing may be other than vacuum brazing.

The braze layer may enable a fit tolerance between the component and adjacent components, such as, for example, between the surface of a micromixer tube and an inner surface of a plate aperture, of between about 0.01 mm to about 0.20 mm. Thus, according to the various embodiments, the fit tolerance may range from about 0.01 mm to about 0.20 mm, and in various embodiments, the fit tolerance may be 0.01, 0.02, 0.03, 0.04, 0.05, 0.06, 0.07, 0.08, 0.09, 0.10, and 0.20 mm, and fractions there between. The braze surface treatment is particularly suited to achieve an enhanced surface smoothness to the additively manufactured component, including filling minor gaps, cracks and surface imperfections, and providing enhanced surface properties including hardness, abrasion, thermal and corrosion resistance as compared to conventional micromixer tubes that are additively manufactured and not similarly treated.

In accordance with the methods, the surface smoothness enhancements provide a braze coating thickness in the range from about 0.01 mm to about 1.00 mm, and confer changes in surface roughness of from about 50 to about 5 microns, and more particularly from about 30 to about 10 microns. Thus, according to the various embodiments, the braze coating may range from about 0.01 mm to about 1.00 mm thickness, and in various embodiments, the thickness may be 0.01, 0.02, 0.03, 0.04, 0.05, 0.06, 0.07, 0.08, 0.09, 0.10, 0.20, 0.30, 0.40, 0.50, 0.60, 0.70, 0.80, 0.90, and 1.00 mm, and fractions there between.

Further, reduction in surface roughness can be achieved from at least 5 to about 50 microns. Accordingly, in various embodiments, the treated surface of the component is characterized by a net reduction in surface roughness in the range from about 5 microns to about 50 microns, wherein the change may be 1, 2, 3, 4, 5, 6, 7, 8, 9, 10, 11, 12, 13, 14, 15, 16, 17, 18, 19, 20 and from 20 to 50 microns including increments of 1 micron there between.

In accordance with the foregoing, treatment according to the disclosed method provides a braze film on the surface of the treated component wherein the film has a thickness that varies from one portion of the component surface to another portion, influenced by the variations in surface texture prior to treatment. Thus, in various embodiments, the film thickness as applied to a component or portion thereof may vary in the range from about 5 to about 50 microns.

In accordance with the various embodiments, the surface treatments provide components having significant reduction of surface roughness as compared with as-printed DMLM components. The treatments also seal surface cracks present on external and internal surfaces that are artifacts of the DMLM process. Treated components demonstrate enhanced surface properties that confer enhanced resistance to corrosion, oxidation, and erosion.

Thus, a technical advantage of the present surface treatment includes greater longevity of additively manufactured parts. Another advantage is reduction of cost associated with repairs. And yet another advantage is the option of selecting alternate base materials for the additively manufactured parts includes CoCrMo parts that may be surface treated according to the instant disclosure with higher temperature material to achieve enhanced performance.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A manufactured article, comprising:
   an additively manufactured component having sequentially joined layers of metallic powder, and
   a braze film disposed on a surface of the additively manufactured component having the sequentially joined layers of metallic powder, the braze film having a contiguous thickness above the additively manufactured component of about 0.01 mm to about 1.0 mm;
   wherein the braze film includes a surface roughness less than the surface the braze film is disposed on, and forms a finished surface of the manufactured article.

2. The article according to claim 1, wherein the additively manufactured component comprises a metallic material selected from the group consisting of nickel-based superalloy, cobalt-based superalloy, iron-based superalloy, and combinations thereof.

3. The article according to claim 1, further comprising at least one additional layer adjacent to the braze film, the at least one additional layer being selected from the group consisting of corrosion resistant alloys, abrasion resistant alloys, and combinations thereof.

4. The article according to claim 1, wherein the braze film has a thickness from about 0.025 mm to about 0.635 mm.

5. The article according to claim 4, wherein the braze film has a thickness of about 0.05 mm.

6. The article according to claim 1, wherein the thickness of the braze film varies inversely across the surface relative to a surface variation of the surface, varying in thickness by about 5 μm to about 50 μm.

7. A method for fabricating a manufactured article, comprising the steps of:
   forming an additively manufactured component having sequentially joined layers of metallic powder by an additive manufacturing process; and
   applying a braze film to a surface of the additively manufactured component having the sequentially joined layers of metallic powder, the braze film having a contiguous thickness above the additively manufactured component of about 0.01 mm to about 1.0 mm.
   wherein the braze film includes a surface roughness less than the surface the braze film is disposed on, and forms a finished surface of the manufactured article.

8. The method for fabricating the manufactured article according to claim 7, wherein the additive manufacturing technique is selected from the group consisting of direct metal laser sintering, selective laser sintering, selective laser melting, electron beam melting, and combinations thereof.

9. The method for fabricating the manufactured article according to claim 8, wherein the additive manufacturing technique includes direct metal laser sintering.

10. The method for fabricating the manufactured article according to claim 7, wherein applying the braze film includes applying a braze material followed by vacuum brazing.

11. The method for fabricating the manufactured article according to claim 7, wherein applying the braze film includes at least partially filling at least one crack disposed in the surface.

12. The article according to claim 1, wherein the surface is an entire surface of the additively manufactured component.

13. The article according to claim 1, wherein the surface includes at least one of an internal surface of the additively manufactured component and an external surface of the additively manufactured component.

14. The article according to claim 13, wherein the surface includes the internal surface of the additively manufactured component.

15. The article according to claim 13, wherein the surface includes both the internal surface of the additively manufactured component and the external surface of the additively manufactured component.

16. The article according to claim 1, wherein the additively manufactured component is a gas turbine component or a steam turbine component.

17. The article according to claim 16, wherein the gas turbine component or steam turbine component is selected from the group consisting of a combustor, a combustion liner, a combustion flex tip, a transition piece, a hot gas path component, a shroud, a bucket, a nozzle, a seal, and combinations thereof.

18. The article according to claim 1, wherein the surface includes a micro-channel surface, a nozzle bar surface, a micromixer plenum surface, a micromixer tube assembly surface, a combustion flex tip surface, a microchannel cooled shroud surface, and combinations thereof.

19. The article according to claim 1, wherein the braze film includes a composition selected from the group consisting of nickel-based superalloys, cobalt-based superalloys, a formula, by mass, of $Ni_{0.6715}Cr_{0.14}B_{0.0275}Co_{0.1}Al_{0.035}Ta_{0.025}Y_{0.001}$, a formula, by mass, of $Ni_{0.71}Cr_{0.0.19}Si_{0.10}$, and combinations thereof.

20. The article according to claim 1, wherein the metallic powder includes a composition, by mass, selected from the group consisting of $Co_{0.70}Cr_{0.27}Mo_{0.03}$, $Ti_{balance}Al_{0.06}Va_{0.04}$, $Co_{balance}Cr_{0.28}Mo_{0.06}$, $Ni_{balance}Cr_{0.20}Co_{0.10}Mo_{0.08}Al_{0.015}Ti_{0.02}$, $Co_{0.39-0.41}Cr_{0.19-0.21}Ni_{0.14-0.16}Fe_{0.113-0.205}Mo_{0.06-0.08}Mn_{0.015-0.025}$, $Ni_{0.50-0.55}Cr_{0.17-0.21}Fe_{balance}Mo_{0.028-0.033}Nb_{0.0475-0.055}Co_{0.01}Mn_{0.0035}Cu_{0.002-0.008}Al_{0.0065-0.0115}Ti_{0.003}$, $Ni_{balance}Cr_{0.20-0.23}Fe_{0.05}Mo_{0.08-0.10}Nb+Ta_{0.0315-0.0415}Co_{0.01}Mn_{0.005}Al_{0.004}Ti_{0.004}$, and combinations thereof.

* * * * *